(12) United States Patent
Malaga Mellado et al.

(10) Patent No.: US 6,930,210 B2
(45) Date of Patent: Aug. 16, 2005

(54) PROCESS TO PRODUCE POLYETHER POLYOLS

(75) Inventors: Mariano Malaga Mellado, Madrid (ES); Dolores Blanco Gonzalez, Alcorcón (ES); Beatriz Montalvo Barroso, Leganés (ES)

(73) Assignee: Repsol Quimica S.A., Madrid (ES)

( * ) Notice: Subject to any disclaimer, the term of this patent is extended or adjusted under 35 U.S.C. 154(b) by 0 days.

(21) Appl. No.: 10/374,631

(22) Filed: Feb. 25, 2003

(65) Prior Publication Data

US 2003/0163006 A1 Aug. 28, 2003

(30) Foreign Application Priority Data

Feb. 25, 2002 (ES) .......................................... 200200455

(51) Int. Cl.⁷ ............................................... C07C 43/34
(52) U.S. Cl. ...................................... 568/621; 568/620
(58) Field of Search ................................ 568/620, 621

(56) References Cited

U.S. PATENT DOCUMENTS

| | | | | |
|---|---|---|---|---|
| 3,404,109 A | | 10/1968 | Milgrom | 260/611 |
| 3,493,518 A | * | 2/1970 | Mason et al. | 502/86 |
| 3,941,849 A | | 3/1976 | Herold | 528/92 |
| 4,355,188 A | | 10/1982 | Herold et al. | 568/620 |
| 4,721,818 A | | 1/1988 | Harper et al. | 568/620 |
| 4,843,054 A | | 6/1989 | Harper | 502/175 |
| 4,877,906 A | | 10/1989 | Harper | 568/621 |
| 4,987,106 A | * | 1/1991 | Mizutani et al. | 501/147 |
| 4,987,271 A | * | 1/1991 | Watabe et al. | 568/621 |
| 5,010,047 A | | 4/1991 | Schuchardt | 502/24 |
| 5,099,075 A | | 3/1992 | Katz et al. | 568/621 |
| 5,144,093 A | | 9/1992 | Reisch et al. | 568/621 |
| 5,158,922 A | | 10/1992 | Hinney et al. | 502/175 |
| 5,248,833 A | | 9/1993 | Hinney et al. | 568/621 |
| 5,416,241 A | | 5/1995 | Ruszkay | 568/621 |
| 5,844,070 A | | 12/1998 | Hayes et al. | 528/501 |
| 5,973,096 A | * | 10/1999 | Watabe et al. | 528/15 |
| 6,252,039 B1 | * | 6/2001 | Becker et al. | 528/485 |

FOREIGN PATENT DOCUMENTS

| | | | | |
|---|---|---|---|---|
| EP | 0 385 619 A2 | | 9/1990 | ........... C08G/65/30 |
| EP | 0 700 949 A2 | | 3/1996 | ........... C08G/65/10 |
| JP | 56022323 | * | 3/1981 | ........... C08G/65/30 |
| JP | 10-263411 | * | 6/1998 | ........... B01J/35/02 |
| WO | 97/40086 | | 10/1997 | ........... C08G/65/10 |
| WO | 98/16310 | | 4/1998 | ........... B01J/27/06 |
| WO | 99/19063 | | 4/1999 | ........... B01J/27/26 |
| WO | 99/47582 | | 9/1999 | ........... C08G/65/30 |

OTHER PUBLICATIONS

Ruiz–Hitzky, E., "Molecular Access to Intracrystalline Tunnels of Sepiolite," *J. Mater. Chem.*, vol. 11, pp 86–91 (2001).

* cited by examiner

*Primary Examiner*—Rosalynd Keys
(74) *Attorney, Agent, or Firm*—Ladas & Parry LLP

(57) ABSTRACT

The invention relates to a process to produce high-purity, low-odour polyether polyols, with very low levels of catalytic residues, by means of alkene oxide polyaddition reactions to substances that contain active hydrogens in the presence double metal cyanides as catalysts. The process is characterized in that the reaction is carried out in the presence of sepiolites and/or by subsequent treatment with sepiolites of the polyether polyols produced with double metal cyanides in the absence of sepiolites.

28 Claims, No Drawings

PROCESS TO PRODUCE POLYETHER POLYOLS

FIELD OF THE INVENTION

The invention relates to a process to produce high-purity, low-odour polyether polyols, with very low levels of catalytic residues, by means of alkene oxide polyaddition to substances that contain active hydrogens in the presence double metal cyanides as catalysts, characterized in that it uses sepiolites either in the reaction stage or at a later purification stage to eliminate the catalytic residues and other impurities.

BACKGROUND OF THE INVENTION

It is known that double metal cyanides, generally known as DMC catalysts, can be used to catalyse alkene oxide polyaddition reactions in substances that contain active hydrogens (see, e.g. the patents U.S. Pat. No. 3,404,109, U.S. Pat. No. 3,941,849 and U.S. Pat. No. 5,158,922). The use of these DMC catalysts in the production of polyether polyols permits achieving, specifically, a reduction in the content of monofunctional polyether polyols with a terminal double bond, in comparison with those polyether polyols produced by conventional polyether polyol production processes using alkaline catalysts, e.g. potassium hydroxide. The polyether polyols thus obtained permit the production of polyurethanes with improved properties for their use as elastomers, foams, etc.

DMC catalysts are usually produced by the treatment of aqueous solutions of metal salts with aqueous solutions of metal cyanide salts in the presence of organic ligands with low molecular weights, e.g. ethers. In a typical preparation of these catalysts, an aqueous solution of zinc chloride (in excess) is mixed with an aqueous solution of potassium hexacyanocobaltate with dimethoxyethane (diglyme) to form a suspension. After separating the solid catalyst by filtering and washing it with an aqueous solution of diglyme, active catalysts with general formula $Zn_3[Co(CN)_6]_2 \cdot xZnCl_2 \cdot yH_2O \cdot zDiglyme$ (see, e.g. EP 700 949), are produced. The patent applications EP 700 949, WO 97/40086 and WO 98/16310 disclose improved DMC catalysts that use functionalized polyether polyols or polymers in addition to double metal cyanide and the organic ligand. These improved DMC catalysts have high activity and permit the production of polyether polyols with low concentrations of catalytic residues (20–25 p.p.m, see Table 1 in WO 98/16310). Patent application WO 99/19063 discloses crystalline double metal cyanides, which are high activity catalysts to produce polyether polyols. In the patent U.S. Pat. No. 5,844,070 a rapid activation process of DMC catalysts is disclosed.

Likewise, various processes have been disclosed for the elimination of catalytic residues in polyether polyols produced with DMC catalysts (see, e.g. the patents U.S. Pat. No. 4,355,188, U.S. Pat. No. 4,721,818, U.S. Pat. No. 4,877,906, U.S. Pat. No. 4,987,271, U.S. Pat. No. 5,010,047, EP 0385 619, U.S. Pat. No. 5,099,075, U.S. Pat. No. 5,144,093, U.S. Pat. No. 5,248,833, U.S. Pat. No. 5,416,241, U.S. Pat. No. 5,416,241 and U.S. Pat. No. 5,973,096. Although these processes are effective for the elimination of the catalytic residues of polyether polyols produced with DMC catalysts, they generally require the use of additional reagents and relatively complicated operations. U.S. Pat. No. 4,843,054, proposes the preparation of filterable DMC catalysts suitable for the polymerization of propylene oxide. For this, the reaction of zinc chloride and potassium hexacyanocobaltate is carried out in water-diglyme in the presence of an inert filtration coadjuvant. In said patent, alumina, silica gel, aluminium silicate, magnesium silicate, diatomaceous earth, perlite, carbon black, carbon, etc are mentioned as inert filtration coadjuvants. That patent therefore relates to an improved process to prepare DMC catalysts.

It can be appreciated that the art has been searching for increasingly DMC catalysts to reduce the concentration of catalytic residues in the polyols and thus be able avoid tedious, costly processes to eliminate the catalytic residues. Nevertheless, at the present time, there is a need for polyols with even lower catalytic residues and which are also free from other impurities, which give the polyether polyols undesirable characteristics. In this way, it is known that the polyols produced by the aforementioned processes, and the polyurethanes produced with them, generally have a very unpleasant odour. Although this odour does not negatively affect the chemical properties of the polyether polyols, it would be desirable to have polyols without said unpleasant odours. The known processes to eliminate these odours are complicated and costly (see, e.g. patent application WO 99/47582).

DETAILED DESCRIPTION OF THE INVENTION

For our part, surprisingly, we have discovered that the activity in the DMC catalysts can be considerably increased when the alkene oxide polyaddition reaction to substances, which contain active hydrogens, is carried out in the presence of sepiolites. Once the reaction has finished, polyether polyols can be produced with very low concentrations of metal residues by simple filtration, even using first generation DMC catalysts with relatively low activities. Furthermore, polyether polyols thus produced have reduced odour, without the need for additional treatments, which is a great advantage with respect to the polyols known in the current state of the art. Furthermore, we have also discovered that the treatment of the brute polyols produced with DMC catalysts permits the effective elimination of the catalytic residues and of the substances which cause the bad odour. Without the intention of binding ourselves to any theory, it can be assumed that the sepiolites, due to their high absorption capacity, are capable of selectively absorbing and eliminating both the substances which cause the bad odour and the catalytic residues and they simultaneously act as filtration coadjuvants, drastically reducing the filtration times.

The invention relates, in general, to the use of sepiolites in the production of high-purity, low-odour polyether polyols, with very low levels of catalytic residues, by means of the alkene oxide polyaddition to substances that contain active hydrogens in the presence of double metal cyanides as catalysts. The sepiolites can either be used in the reaction stage or at a later purification stage to eliminate catalytic residues or other impurities.

The object of this invention is thus a process to produce high-purity polyether polyols, with very low levels of catalytic residues and low odour, characterized in that the alkene oxide polyaddition reaction to substances that contain active hydrogens takes place in the presence of double metal cyanides and sepiolites or by subsequent treatment with sepiolites of the brute polyether polyols produced by double metal cyanides in the absence of sepiolites. "High-purity" as is used in this description, means that the polyether polyols produced are extraordinarily transparent and have very strict specifications as regards the fundamental parameters of the polyols (hydroxyl content, acidity value, nonsaturation, etc.) which are known by those skilled in the art. A process such as that provided by the invention permits producing high-purity, low-odour polyether polyols with very low levels of catalytic residues, e.g. with a content in Zn and Co less than or equal to 5 p.p.m.

Any of the DMC catalysts known in the current state of the art can be as catalysts in the framework of this invention. First generation catalysts with relatively low activity can even be used, as in the presence of sepiolites their activity increases and the catalytic residues of the polyols are eliminated.

The sepiolites that are used in the framework of this invention are described, e.g. in J. Mater. Chem. 2001, 11, 86–91. They are microcrystalline hydrated magnesium silicates with general formula $Si_{12}O_{30}Mg_8(OH, F)_4(H_2O)_4 \cdot 8H_2O$. In its structure, two types of water molecules are included; i)water molecules coordinated to $Mg^{2+}$ ions and ii) water molecules associated to the aforementioned by hydrogen bonds. This last type of water molecule can be easily eliminated by treatment in vacuo or by thermal treatment at approximately 100° C., whilst the first need severer conditions (>350° C., dynamic vacuum) for the complete dehydration of the silicate. In the framework of the invention, sepiolites can be used in their hydrated state or, also, partially or totally dehydrated sepiolites can be used. Likewise, activated sepiolites can be used, i.e. sepiolites whose surface properties have been modified by known processes, such as treatment with organic or inorganic acids, bases, or salts, etc.

As substances that contain active hydrogens, one can use substances known in the current state of the art, with molecular weights ranging between 18 and 2000 with between 1 and 8 hydroxyl groups per molecule, e.g. ethylene glycol, diethylene glycol, triethylene glycol, 1,2-propylene glycol, dipropylene glycol, 1,4-butanediol, hexamethylene glycol, bisphenol A, trimethylolpropane, glycerine, pentaerythrite, sorbitol, sugars, etc. It is preferable that substances with low molecular weight are previously converted in alcoxyl derivatives with molecular weights between 200 and 2,000 by reacting with alkene oxides, e.g. in the presence of conventional alkaline catalysts.

The sepiolite and the DMC catalyst can be added separately to the reactor. The DMC catalyst can also be previously mixed with the sepiolite and added together to the reactor. In this last case, the catalyst-sepiolite mixture can previously undergo an activation treatment. This treatment can consist of heating to eliminate the volatile compounds such as water, solvent residues and organic ligands used in the catalyst synthesis, etc. This elimination of volatile compounds can be favoured in vacuo. If desired, the sepiolite can also be added at the catalyst preparation stage, e.g. when the aqueous solutions, e.g. of zinc chloride, potassium hexacyanocobaltate and the organic ligand come into contact. In this case, the precipitation of the zinc hexacyanocobaltate complex takes place in the presence of the sepiolite. By means of final filtration, suitable mixtures of sepiolite and DMC catalysts within the framework of this invention, are produced.

The alkene oxide polyaddition reaction to substances that contain active hydrogens in the presence of sepiolites and DMC catalysts is generally carried out at temperatures between 20° C. and 200° C., preferably between 40° C. and 180° C. and better between 40° C. and 150° C. The reaction can be carried out at total pressures of 0 to 20 bars. The polyaddition can be performed in the bosom of the liquid alkene or in the presence of solvents such as toluene, ethylbenzene and/or tetrahydrofurane (THF). The quantity of solvent necessary is generally between 10 and 30% in weight with respect to the quantity of polyether polyol produced. Illustrative examples of alkene oxides that can be used to put this invention into practice include, amongst others, ethylene oxide, propylene oxide, 1,2-butylene oxide, butadiene monoxide, styrene oxide, cyclohexane oxide, glycidic alkyl esters, etc.

The catalyst concentration is chosen so that, in the chosen reaction conditions, good control of the polyaddition reaction is achieved, with sufficiently high rates so as to minimize the reaction times and the reactor size The catalyst concentration is generally chosen from between 0.0005% and 1% in weight with respect to the quantity of polyether polyol produced, depending on the activity of the DMC catalyst. Concentrations in the lower range are preferred for high activity catalysts. Concentrations in the upper range are chosen for those first generation, relatively inactive catalysts. The quantity of sepiolite in the reaction medium is not critical and can generally vary between 0.0005% and 2% in weight of the quantity of polyether polyol produced, preferably between 0.0010% and 1%. Quantities below 0.0005% do not have a significant effect. Quantities higher than 2% are not recommended as they involve an additional cost and do not generally provide substantial advantages as regards the improvement in the odour or the elimination of catalytic residues of polyether polyols.

Once the reaction has finished, the sepiolite is separated by filtration. If desired, filtration coadjuvants known in the state of the art can be used.

The molecular weights of the polyether polyols produced in accordance with the invention are between approximately 500 and 50,000 g/mol, preferably between 2,000 and 20,000 g/mol.

The polyaddition reaction can be carried out in a continuous, discontinuous or semi-continuous manner.

The preparation of high-purity, low-odour polyether polyols, with very low levels of catalytic residues can also be carried out, in accordance with the invention, by treating the brute polyether polyols produced in the presence of DMC catalysts, at temperatures between 20° C. and 200° C., preferably between 50° C. and 150° C. and more preferably between 90° C. and 140° C., for the time necessary for the absorption in the sepiolite of significant quantities of catalytic residues and malodorous substances. The treatment can be carried out in a stirred reactor in which the brute polyether polyol and the sepiolite are introduced. The reactor can operate continuously or discontinuously. The quantity of sepiolite used is not critical and depends on the level of catalytic residues, of desired odour in the final polyether polyol and on the quantity of catalyst used in the production of the brute polyether polyol, and can vary between 15 p.p.m and 5%, generally between 100 p.p.m and 2% in weigh with respect to the quantity of polyether polyol produced. In general, when the catalytic residues of the brute polyether polyol are low, i.e. when high activity DMC catalysts have been used in its synthesis, the quantity of sepiolite necessary to eliminate the catalytic residues is situated in the lower range. Nevertheless, when low activity catalysts have been used in the production of the brute polyether polyol, i.e. when the level of catalytic residues in the brute polyether polyol is relatively high, it is necessary to use quantities of sepiolites situated in the upper range. On the contrary, less odour is achieved in purified polyether polyols in the measure that the sepiolite concentration increases and can typically vary from 15 to 150 minutes and more generally between 30 and 60 minutes, in good stirring conditions. Any skilled person can easily determine the treatment conditions necessary to produce polyether polyols with the desired levels of catalytic residues and odour. Once the treatment has finished, the polyether polyol mixture is filtered to separate the sepiolite that retains the catalytic residues and the majority of bad odours, producing purified polyether polyol as filtrate. The filtration can be carried out with filters used in the current state of the art. In general, the filtration rate is high and filtration coadjuvants are not required, although, if desired, any of the filtration coadjuvants known in the current state of the art can be used.

This invention is illustrated by the following examples, which are, in no way, restrictive of it. A natural mineral from Yunclillas (Toledo, Spain) supplied by TOLSA, S.A, with 99% pure silicate was used as a sepiolite The surface area ($N_2$, BET) is 335 $m^2$/g and the cation exchange capacity (CEC) is 0.15 meq.$g^{-1}$, approximately.

EXAMPLE 1

(Comparative)

This example relates to the preparation of a catalyst in accordance with the prior art. In a four-neck flask, introduce a solution prepared by mixing 75 g of zinc chloride, 275 $m^3$ of water and 50 $cm^3$ of ter-butanol. The solution is heated to 50° C. and, in the course of 30 minutes, a solution of 7.5 g of potassium hexacyanocobaltate in 100$m^3$ of water is added from a separating funnel, stirring at 400 rpm. The mixture is stirred then continuously stirred for another thirty minutes. Finally, a mixture of 50 $cm^3$ of water, 2 $cm^3$ of ter-butanol and 1.6 g of a polyether polyol with a molecular weight of 2,500 is quickly added. It is stirred for an additional 3 minutes and the solid formed is separated by filtration. The solid collected in the filter is successively treated with a solution of 130 $cm^3$ ter-butanol and 55 $cm^3$ of water and 2 9 of Alcupol D-0411 (product commercialized by Repsol-YPF); it is a polyol produced by catalysis with potassium hydroxide which has the following characteristics: functionality=2; molecular weight=400; hydroxyl content= 280 mg KOH/g; iniciator: dipropylene glycol and with 188 $cm^3$ of ter-butyl alcohol and 1 g of Alcupol D-0411. The solid produced is dried in a stove in vacuo at 60° C. until constant weight is reached.

EXAMPLE 2

This example relates to the preparation of a catalyst in accordance with the invention. For this, the preparation described in Example 1 was exactly repeated, except that the solid collected in the filter, after being treated with a solution of 130 cm3 ter-butanol, 55 $cm^3$ water and 2 g of Alcupol D-04111, is mixed with 5 g of sepiolite and is treated with 188 $cm^3$ of ter-butyl alcohol and 1 g of Alcupol D-0411.

EXAMPLE 3

(Comparative)

This example relates to a polyether polyol in accordance with the prior art. For this, 200 g of Alcupol D-0411 and 0.024 g of catalyst prepared according to Example 1, are loaded in an autoclave. The autoclave is purged with nitrogen five times (pressurized until reaching 2 kg/$cm^3$ with nitrogen and forming a vacuum successively). Next, 800 g of propylene oxide are added at a temperature of 120° C. and at a pressure below 0.5 kg/$cm^2$. The reaction rate was 24.7 g of propylene oxide/hour. The polyether polyol isolated at the end of the reaction had an unpleasant odour.

EXAMPLE 4

This example relates to the preparation of a polyether polyol in accordance with the invention. The preparation was carried out with the same quantities of reagents and with the experimental conditions described in Example 3, except that the catalyst prepared according to example 1 was replaced by the catalyst prepared according to Example 2, in accordance with the invention. The reaction rate was, in this case, 35.2 g of propylene oxide/hour, i.e. 42.5% higher. The polyether polyol produced had low odour.

EXAMPLE 5 TO 18

These examples relate to the treatment with sepiolites in the presence of double metal cyanide catalysts, in accordance with the invention. For this, 100 kg of a brute polyol containing 21 p.p.m. of zinc and 4 p.p.m. of cobalt and with an unpleasant odour, a molecular weight of 3,500 g/mol (synthesized by the reaction of propylene oxide with a trifunctional prepolymer with a molecular weight of 700 g/mol) is introduced in a reactor with a 130 litre capacity. Next, a quantity of sepiolite is added and, where appropriate, a filtration coadjuvant, and the mixture is continuously stirred for 30 to 60 minutes at 90–130° C. Once this time has ended, the mixture is filtered to separate the sepiolite and, where appropriate, the filtration coadjuvant, from the purified polyether polyol.

Table 1 shows the results of tests carried out at 100° C., using 0.5–1% of sepiolite with respect to the weight of the brute polyether polyol, for 60 minutes.

TABLE 1

| Treatment conditions: 100° C., 60 minutes | | | |
|---|---|---|---|
| Polyether Polyol | ZN (p.p.m) | Co (p.p.m) | Odour |
| Initial brute polyol | 21 | 4 | Unpleasant |
| Example 5 (0.5% sepiolite) | 5 | 0.7 | Low |
| Example 6 (0.6% sepiolite) | 3 | 0.3 | Low |
| Example 7 (1% sepiolite) | 5 | 0.3 | Low |

Table 2 shows the results produced at temperatures between 90–130° C. using 1% of sepiolite during 60 minutes.

TABLE 2

| Treatment conditions: 1% sepiolite, 60 minutes | | | |
|---|---|---|---|
| Polyether Polyol | ZN (p.p.m) | Co (p.p.m) | Odour |
| Initial | 21 | 4 | Unpleasant |
| Example 8 (T: 90° C.) | 5 | 0.3 | Low |
| Example 9 (T: 100° C.) | 1 | 0.3 | Low |
| Example 10 (T: 110° C.) | 1 | 0.3 | Low |
| Example 11 (T: 120° C.) | 1 | 0.3 | Low |
| Example 12 (T: 130° C.) | 1 | 0.3 | Low |

It can be observed in Table 2 that the temperature does not affect the efficiency of the treatment within the range of 90° C. to 130° C.

Table 3 shows the results of treatment of a brute polyether polyol carried out at 100° C., using 1% sepiolite and for different times.

TABLE 3

| Treatment conditions: 1% sepiolite, 100° C. | | | |
|---|---|---|---|
| Polyether Polyol | ZN (p.p.m) | Co (p.p.m) | Odour |
| Initial | 21 | 4 | Unpleasant |
| Example 13 (30 minutes) | 1 | 0.3 | Low |
| Example 14 (40 minutes) | 1 | 0.3 | Low |
| Example 15 (50 minutes) | 5 | 0.3 | Low |
| Example 16 (60 minutes) | 5 | 0.3 | Low |

It can be observed in table 3 that differences are not appreciated in the efficiency of the treatment within the time range of 30 to 60 minutes.

Table 4 shows the results of tests carried out in the presence of filtration coadjuvants diatamaceous earth, Celatom FW 1.4 darcy permeability and Celite Hyflow Supercel 1.1 darcy permeability.

TABLE 4

Treatment conditions: 100° C., 30 minutes

| Polyether Polyol | ZN (p.p.m) | Co (p.p.m) | Odour |
|---|---|---|---|
| Initial | 21 | 4 | Unpleasant |
| Example 17 (1 sepiolite + 1% Celite Hyflo Supercel) | 1 | 0.3 | Low |
| Example 18 (1% sepiolite and 1.5% Cetatom) | 1 | 0.3 | Low |

As can be observed on comparing the results of Example 13 with those from Examples 17 and 18, differences are not appreciated in the efficiency of the elimination of catalytic residues of the sepiolite in the presence of filtration coadjuvants although they can favour the filtration rate.

What is claimed is:

1. A process for producing high-purity, low odour polyether polyols, with very low levels of catalytic residues, by means of alkene oxide polyaddition reactions to substances that contain active hydrogens in the presence of double metal cyanides as catalysts, wherein the alkene oxide polyaddition reactions take place in the presence of sepiolites.

2. A process according to claim 1, wherein the process uses a sepiolite concentration between approximately 0.0005% in weight and 2% in weight with respect to the quantity of polyether polyol produced.

3. A process according to claim 1, wherein the sepiolites and the double metal cyanide catalysts are added separately to the reaction medium.

4. A process according to claim 1, wherein the sepiolites and the double metal cyanide catalysts are added previously to the reaction medium.

5. A process according to claim 4, wherein the mixture of sepiolites and double metal cyanide catalysts undergoes an activation treatment before being added to the reaction medium.

6. A process according to claim 1, wherein totally or partially dehydrated sepiolites are used.

7. A process according to claim 1, wherein the process uses sepiolites—which are activated by means of treatment with organic or inorganic acids, bases or salts.

8. A process according to claim 1, wherein once the polyaddition reaction has finished, the sepiolites are separated by filtration.

9. A process according to claim 8, wherein a filtration coadjuvant is used.

10. A process to produce high-purity, low-odour polyether polyols, with very low levels of catalytic residues, by means of alkene oxide polyaddition reactions to substances that contain active hydrogens in the presence of double metal cyanides as catalysts, wherein brute polyether polyols that are produced are purified directly with sepiolites without adding any reactant to the brute polyether polyols.

11. A process according to claim 10, wherein sepiolites concentration between 15 p.p.m. and 5% in weight is used with respect to the quantity of brute polyether polyol.

12. A process according to claim 10, wherein partially or totally dehydrated sepiolites are used.

13. A process according to claim 10, wherein the process uses sepiolites activated by means of treatment with organic or inorganic acids, bases, or salts.

14. A process according to claim 10, wherein the treatment with sepiolites is carried out at temperatures between 20° C. and 200° C.

15. A process according to claim 10, wherein said treatment with sepiolites is carried out for a period of time between 30 and 60 minutes.

16. A process according to claim 10, wherein after the treatment with sepiolites has finished, the sepiolites are separated by filtration.

17. A process according to claim 16, wherein a filtration coadjuvant is used.

18. A process according to claim 1, wherein the process uses a sepiolite concentration between approximately 0.001% and 1% in weight with respect to the quantity of polyether polyol produced.

19. A process according to claim 10, wherein a sepiolite concentration between 100 p.p.m. and 2% in weight is used with respect to the quantity of brute polyether polyol produced.

20. A process according to claim 10, wherein the treatment with sepiolites is carried out at temperatures between 50° C. and 150° C.

21. A process according to claim 10, wherein the treatment with sepiolites is carried out at temperatures between 90° C. and 140° C.

22. A process for producing high-purity, low odour polyether polyols containing active hydrogens, with very low levels of catalytic residues, comprising carrying out alkene oxides polyaddition reaction in the presence of double metal cyanides and sepiolites.

23. The process according to claim 18, wherein the reaction is carried out with a sepiolite concentration between approximately 0.0005% in weight and 2% in weight with respect to the produced quantity of polyether polyol.

24. The process according to claim 18, wherein the reaction is carried out with totally or partially dehydrated sepiolites.

25. The process according to claim 18, wherein the reaction is carried out with sepiolites, which are activated with organic or inorganic acids, bases or salts.

26. A process for producing high-purity, low odour polyether polyols containing active hydrogens, with very low levels of catalytic residues, comprising a) carrying out alkene oxides polyaddition reaction in the presence of double metal cyanides to produce brute polyether polyols, and b) treating the produced brute polyether polyols directly with sepiolites without adding any reactant to the brute polyether polyols.

27. The process according to claim 22, wherein the brute polyether polyols is treated with sepiolites at temperatures between 20° C. and 200° C.

28. The process according to claim 22, wherein the brute polyether polyols is treated with sepiolites for a period of time between 30 and 60 minutes.

* * * * *